United States Patent
Zueski et al.

(10) Patent No.: US 12,269,337 B2
(45) Date of Patent: Apr. 8, 2025

(54) AXLE ASSEMBLY HAVING A DRIVE PINION AND A PRELOAD NUT

(71) Applicant: ArvinMeritor Technology, LLC, Troy, MI (US)

(72) Inventors: David M Zueski, Troy, MI (US); Thomas Johns, Troy, MI (US); Robert Martin, Troy, MI (US)

(73) Assignee: ArvinMeritor Technology, LLC

( * ) Notice: Subject to any disclaimer, the term of this patent is extended or adjusted under 35 U.S.C. 154(b) by 212 days.

(21) Appl. No.: 18/159,450

(22) Filed: Jan. 25, 2023

(65) Prior Publication Data

US 2024/0246410 A1  Jul. 25, 2024

(51) Int. Cl.
| | |
|---|---|
| *B60K 17/16* | (2006.01) |
| *B60K 17/24* | (2006.01) |
| *F16H 48/12* | (2012.01) |
| *F16H 48/42* | (2012.01) |
| *F16H 57/022* | (2012.01) |
| *F16H 57/029* | (2012.01) |

(52) U.S. Cl.
CPC .............. *B60K 17/16* (2013.01); *B60K 17/24* (2013.01); *F16H 48/12* (2013.01); *F16H 48/42* (2013.01); *F16H 57/029* (2013.01); *F16H 2048/423* (2013.01)

(58) Field of Classification Search
CPC ......... B60K 17/16; B60K 17/24; F16H 48/12; F16H 48/42; F16H 57/029; F16H 2048/423
See application file for complete search history.

(56) References Cited

U.S. PATENT DOCUMENTS

| | | | |
|---|---|---|---|
| 10,208,846 B2 | 2/2019 | Chinitz | |
| 10,316,950 B2 | 6/2019 | Chinitz et al. | |
| 2003/0130047 A1 | 7/2003 | Brissette et al. | |
| 2009/0008207 A1* | 1/2009 | Hirota | F16D 13/72 |
| | | | 192/70.12 |
| 2010/0247016 A1 | 9/2010 | Rivett et al. | |
| 2010/0267455 A1 | 10/2010 | Valovick | |
| 2013/0047779 A1* | 2/2013 | Martin, III | F16H 48/24 |
| | | | 29/893.1 |
| 2014/0105680 A1 | 4/2014 | Schnebele | |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |
| 2020/0173494 A1 | 6/2020 | Smith et al. | |
| 2020/0173531 A1 | 6/2020 | Smith | |

(Continued)

FOREIGN PATENT DOCUMENTS

| | | | | |
|---|---|---|---|---|
| EP | 2551554 A1 * | 1/2013 | ............. | F16H 48/40 |
| JP | 2003232346 A * | 8/2003 | ............. | F16C 19/163 |
| WO | 2021011953 A1 | 1/2021 | | |

OTHER PUBLICATIONS

Extended European Search Report dated Jun. 3, 2024 for related application No. 24153777.8; 10 Pages.

*Primary Examiner* — Tinh Dang
(74) *Attorney, Agent, or Firm* — Brooks Kushman PC

(57) ABSTRACT

An axle assembly having a differential carrier, a drive pinion, a bearing assembly, and a preload nut. The drive pinion has a shaft that has a threaded portion. The bearing assembly rotatably supports the drive pinion on the differential carrier. The preload nut mates with the threaded portion and exerts a preload force on the bearing assembly.

20 Claims, 7 Drawing Sheets

(56) References Cited

U.S. PATENT DOCUMENTS

| | | |
|---|---|---|
| 2020/0173535 A1 | 6/2020 | Peng et al. |
| 2020/0173537 A1 | 6/2020 | Begov et al. |
| 2020/0173541 A1 | 6/2020 | Soffner et al. |
| 2020/0177049 A1 | 6/2020 | Raya et al. |
| 2020/0177059 A1 | 6/2020 | Smith et al. |
| 2020/0232548 A1 | 7/2020 | Stecker et al. |
| 2020/0309244 A1* | 10/2020 | Kimura ................. F16H 57/021 |
| 2022/0212498 A1 | 7/2022 | Raya |

\* cited by examiner

AXLE ASSEMBLY HAVING A DRIVE PINION AND A PRELOAD NUT

TECHNICAL FIELD

This relates to an axle assembly that has a drive pinion and a preload nut and a method of assembly.

BACKGROUND

An axle assembly having a drive pinion and a bearing preload element is disclosed in U.S. Pat. No. 10,316,950.

SUMMARY

In at least one embodiment an axle assembly is provided. The axle assembly includes a differential carrier, a drive pinion, a bearing assembly, a preload nut, and a seal assembly. The drive pinion is rotatable about an axis. The drive pinion includes a gear and a shaft that extends from the gear. The shaft has a threaded portion. The bearing assembly encircles the shaft and rotatably supports the drive pinion on the differential carrier. The preload nut has a thread that mates with the threaded portion of the shaft. The preload nut engages the bearing assembly and exerts a preload force on the bearing assembly. The seal assembly encircles the preload nut. The seal assembly extends from the preload nut to the differential carrier.

The preload nut may have an external circumferential surface. The external circumferential surface may encircle the axis. The external circumferential surface may face away from the axis. The seal assembly may engage the external circumferential surface.

The shaft may include an outer surface. The shaft may include a spline. The threaded portion may be axially positioned between the outer surface and the spline.

The axle assembly may include a yoke. The yoke may be mounted to the shaft. The yoke may encircle the shaft. The yoke may inhibit rotation of the preload nut.

The bearing assembly may have an inner race. The preload nut may extend axially from the inner race to the yoke.

The seal assembly may encircle and engage the preload nut. The seal assembly may encircle and engage the yoke.

The preload nut may have an end surface. The end surface may engage the yoke. The preload nut may have one or more blind holes. A blind hole may extend from the end surface toward the bearing assembly.

The deflector may extend from the yoke. The deflector may encircle a portion of the differential carrier.

The yoke may have a yoke end surface. The yoke end surface may engage the preload nut.

The yoke may have a first outer yoke surface. The first outer yoke surface may face away from the axis. The first outer yoke surface may extend from the yoke end surface. The seal assembly may engage the first outer yoke surface.

The yoke may have a second yoke outer surface. The second yoke outer surface may face away from the axis. The second yoke outer surface may be disposed farther from the axis than the first outer yoke surface is disposed from the axis. The deflector may engage the second yoke outer surface.

The first outer yoke surface may be disposed closer to the axis than the external circumferential surface of the preload nut is disposed to the axis. The first outer yoke surface may be disposed closer to the axis than the second yoke outer surface is disposed to the axis.

The seal assembly may have an inner member. The inner member may extend from the differential carrier to the external circumferential surface of the preload nut. The seal assembly may have an outer member. The outer member may extend from the first yoke outer surface toward the differential carrier. The outer member may be encircled by the differential carrier. The outer member may be encircled by the inner member.

In at least one configuration, an axle assembly is provided. The axle assembly includes a differential carrier, a drive pinion, a bearing assembly, a preload nut, and a seal assembly. The drive pinion is rotatable about an axis. The drive pinion includes a gear and a shaft that extends from the gear. The shaft has a threaded portion. The bearing assembly encircles the shaft and rotatably supports the drive pinion on the differential carrier. The preload nut has a thread. The threat mates with the threaded portion of the shaft. The preload nut engages the bearing assembly and exerts a preload force on the bearing assembly. The seal assembly encircles the shaft. The seal assembly extends from the shaft to the differential carrier.

The seal assembly may be spaced apart from the preload nut. The seal assembly may be axially positioned between the preload nut and the yoke.

The shaft may have a spline. The spline may engage the yoke. The shaft may have a journal surface. The journal surface may face away from the axis. The journal surface may be axially positioned between the threaded portion and the spline of the shaft. The seal assembly may engage the journal surface.

The journal surface may be positioned closer to the axis than the threaded portion is positioned to the axis. The journal surface may be positioned farther from the axis than the spline is positioned from the axis.

The seal assembly may have an inner member. The inner member may extend from the differential carrier to the journal surface. The inner member may be spaced apart from the preload nut. The inner member may be spaced apart from the yoke.

The seal assembly may have an outer member. The outer member may extend from the yoke. The outer member may engage the inner member. The outer member may encircle the differential carrier. The outer member may encircle the inner member.

The axle assembly may include first and second retaining features. The first and second retaining features may be separate from the shaft. The first and second retaining features may be mounted to the shaft. The first retaining feature may engage the yoke to inhibit movement of the yoke away from the preload nut. The second retaining feature may engage the yoke to inhibit movement of the yoke toward the preload nut. The first retaining feature may be received in a first groove of the shaft. The second retaining feature may be received in a second groove of the shaft. The yoke may encircle the second retaining feature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
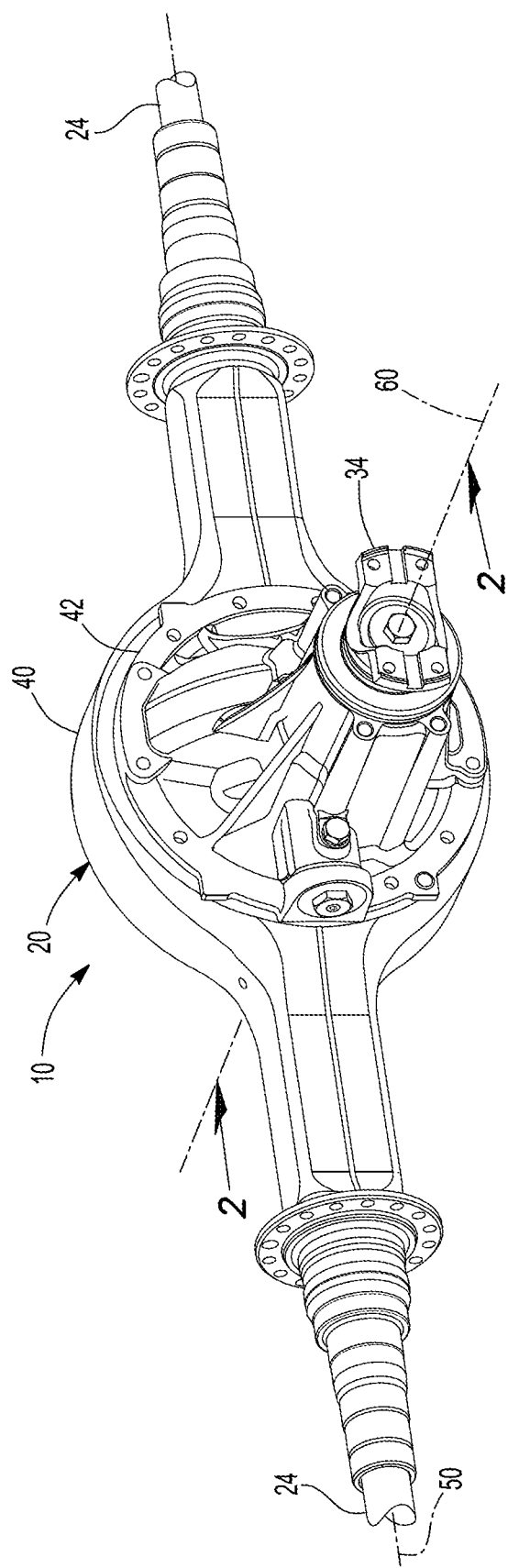
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 is configured to provide torque to one or more traction wheel assemblies that may include a tire mounted on a wheel. The wheel may be mounted to a wheel hub that may be rotatable about a wheel axis.

Figure 2:
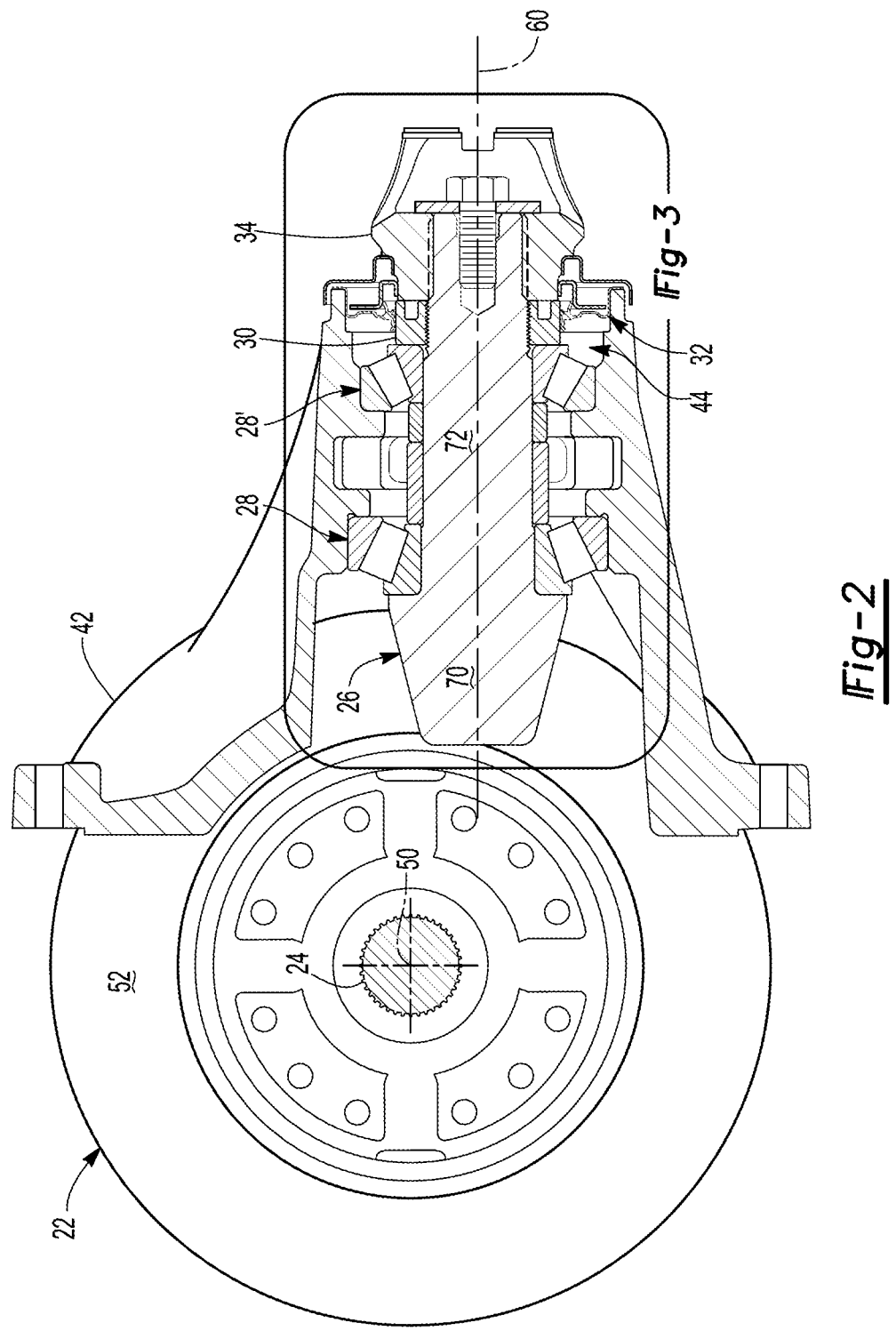
FIG. 2 is a section view of the axle assembly of FIG. 1 along section line 2-2 with an axle housing of the axle assembly omitted for clarity.

One or more axle assemblies may be provided with the vehicle. In FIG. 1, a single axle assembly 10 is shown. As is best shown with reference to FIG. 1 or 2, the axle assembly 10 may include a housing assembly 20, a differential assembly 22, and at least one axle shaft 24. As is best shown in FIG. 2, the axle assembly 10 includes a drive pinion 26, at least one bearing assembly 28, 28', a preload nut 30, and a seal assembly 32. The axle assembly 10 may also include a yoke 34.

Referring to FIG. 1, the housing assembly 20 receives various components of the axle assembly 10. In addition, the housing assembly 20 may facilitate mounting of the axle assembly 10 to the vehicle. For instance, the housing assembly 20 may include an axle housing 40 and a differential carrier 42. Optionally, one or more additional housings may be provided with the housing assembly 20, such as an electric motor housing if an electric motor is provided with the axle assembly 10.

The axle housing 40 at least partially receives the differential assembly 22. The axle housing 40 may also have arm portions that receive and support the axle shafts 24.

The differential carrier 42 is removably mountable to the axle housing 40. The differential carrier 42 supports the differential assembly 22. For instance, the differential carrier 42 may include bearing supports upon which bearing assemblies are disposed that rotatably support the differential assembly 22. In at least one configuration and as is best shown in FIG. 2, the differential carrier 42 may also include a cavity 44 through which the drive pinion 26 may extend.

Referring to FIG. 2, the differential assembly 22 is receivable inside the housing assembly 20. The differential assembly 22 may be rotatable about a differential axis 50 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 52 that may have teeth the mate or mesh with the teeth of a gear of the drive pinion 26. Accordingly, the differential assembly 22 may receive torque from the drive pinion 26 via the ring gear 52 and transmit torque to the axle shafts 24.

Referring to FIGS. 1 and 2, the axle shafts 24 transmit torque between the differential assembly 22 and corresponding wheel hubs and wheels. Two axle shafts 24 may be provided such that each axle shaft 24 extends through a different arm portion of the axle housing 40. The axle shafts 24 or a portion thereof may extend along and may be rotatable about an axis, such as the differential axis 50 or an axis that differs from the differential axis 50. Each axle shaft 24 may have a first end and a second end. The first end may be operatively connected to the differential assembly 22. The second end may be disposed opposite the first end and may be operatively connected to a wheel, such as via a wheel hub. Optionally, gear reduction may be provided between an axle shaft 24 and a wheel.

Figure 3:
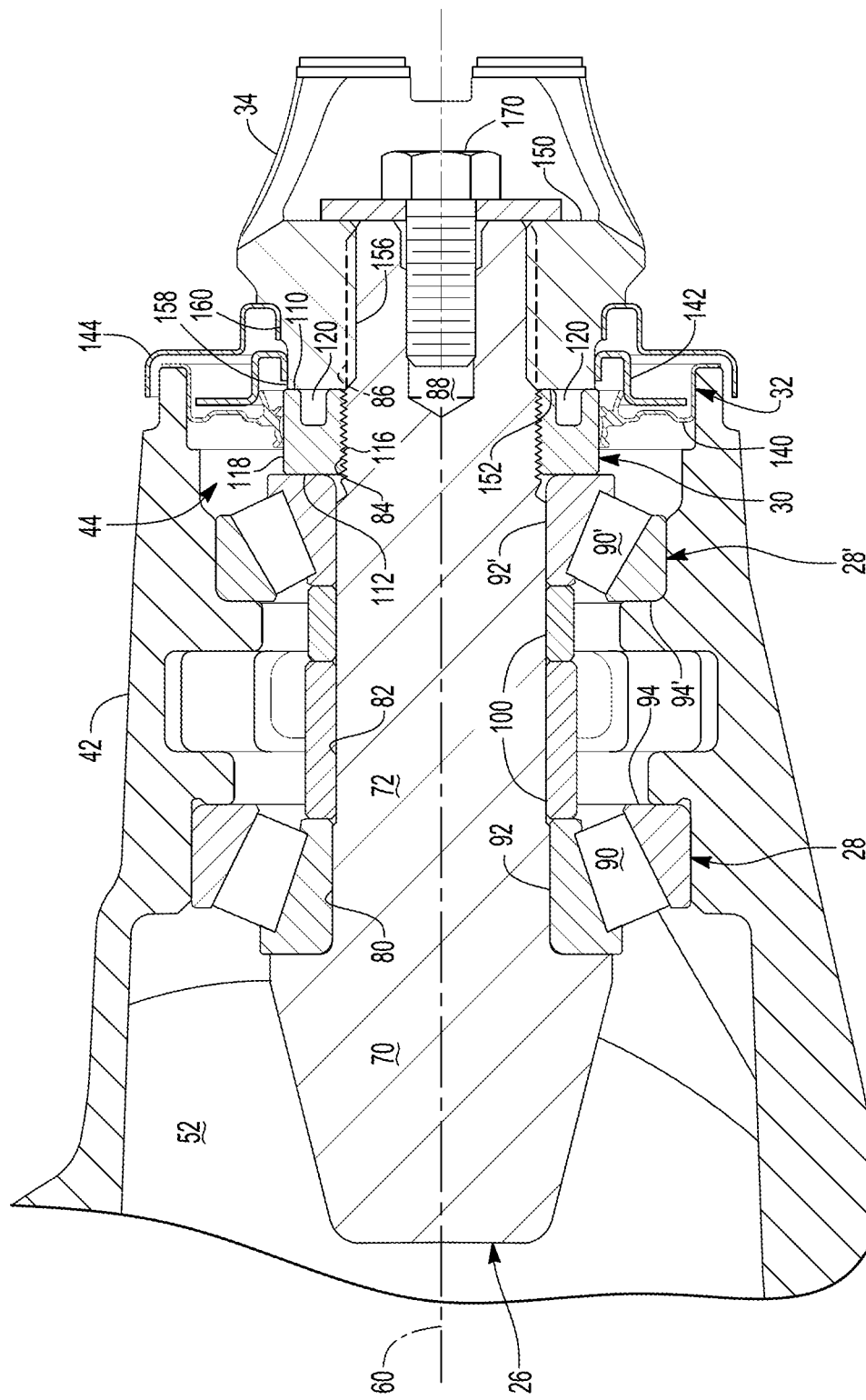
FIG. 3 is a magnified view of a portion of FIG. 3.
Figure 4:
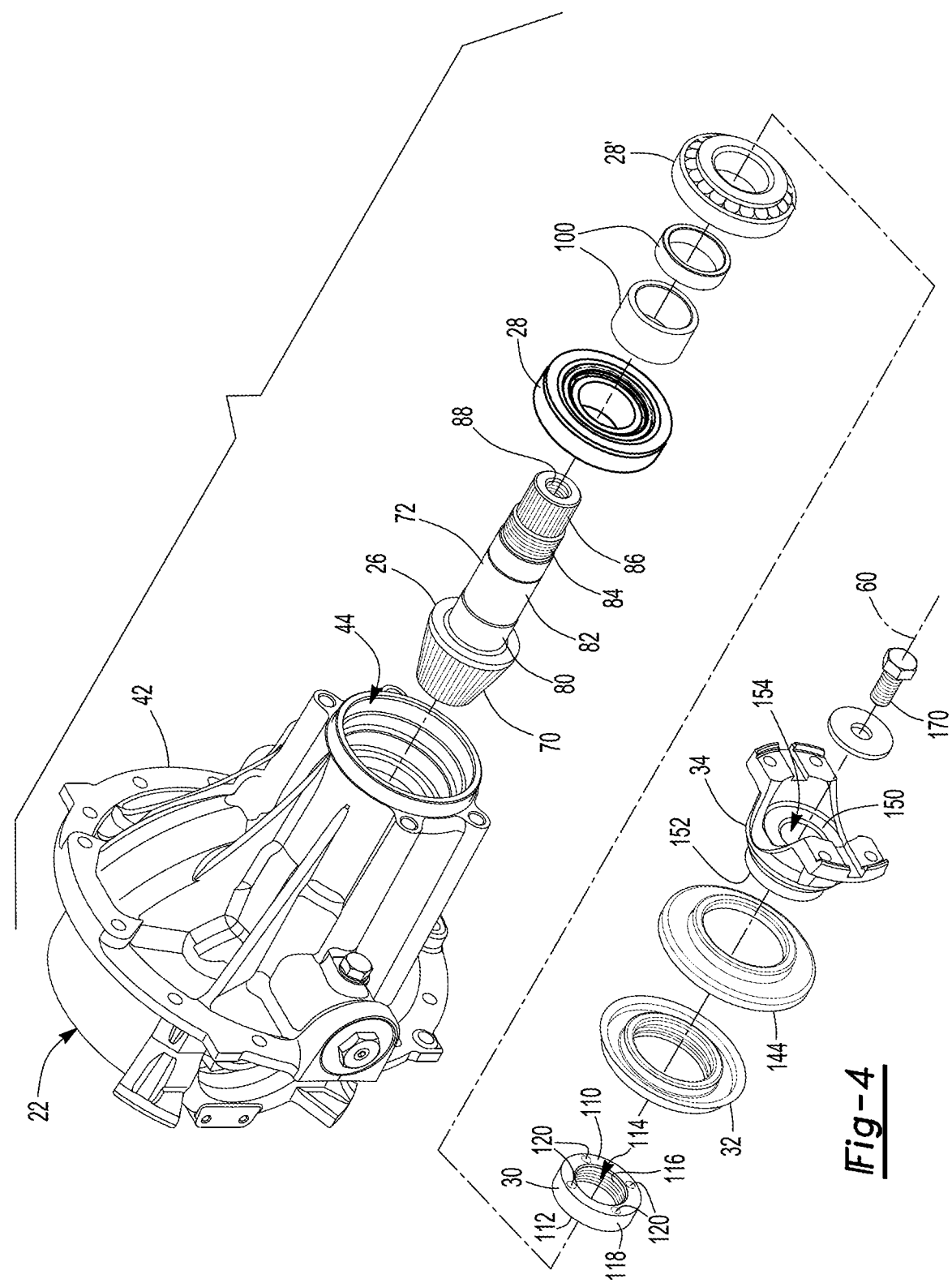
FIG. 4 is an exploded view of the portion of the axle assembly shown in FIG. 3.

Referring to FIGS. 2-4, the drive pinion 26 is configured to transmit torque between a power source or torque source and the differential assembly 22 via the ring gear 52. The power source may be of any suitable type. For instance, the power source may be an electrical power source or a non-electrical power source. An example of an electrical power source is an electrical machine like an electric motor. An example of a non-electrical power source is an internal combustion engine. In the configuration shown in FIG. 1, the power source is configured to be located remotely from the axle assembly 10 and may be operatively connected to the axle assembly 10 via a linkage like a shaft; however, it is contemplated that the power source, whether electrical or non-electrical, may be provided with the axle assembly 10.

Referring to FIGS. 3 and 4, the drive pinion 26 is rotatable about an axis 60. The axis 60 may be disposed substantially perpendicular to the differential axis 50. The drive pinion 26 may also extend along or around the axis 60. In at least one configuration, the drive pinion 26 includes a gear 70 and a shaft 72.

The gear 70 may be disposed at or near an end of the shaft 72. The gear 70 may have a plurality of teeth that may mate with corresponding teeth on the ring gear 52. The teeth of the ring gear 52 and the gear 70 are simplified or not shown in the figures, but it is to be understood that the teeth of the gear 70 may have any suitable configuration that is compatible with the teeth of the ring gear 52, including but not limited to spiral teeth, hypoid teeth, etc., as is known by those skilled in the art. The gear 70 may be integrally formed with the shaft 72 or may be provided as a separate component that may be fixedly disposed on the shaft 72.

The shaft 72 may extend from the gear 70. For instance, the shaft 72 may extend from the gear 70 in a direction that extends away from the differential assembly 22. In at least one configuration such as is best shown with reference to FIG. 4, the shaft 72 may include at least one outer surface, such as a first outer surface 80 and/or a second outer surface 82, a threaded portion 84, and a spline 86. The shaft 72 may also include a fastener hole 88.

Referring to FIGS. 3 and 4, the first outer surface 80 may extend from the gear 70 and may be an outside circumference of a portion of the shaft 72. As such, the first outer surface 80 may face away from the axis 60. One or more bearing assemblies 28 that may be disposed in the cavity 44 of the differential carrier 42 may be disposed on the first outer surface 80 and may rotatably support the drive pinion 26. The bearing assemblies 28 may have any suitable configuration. For instance, a bearing assembly 28 may be configured as a roller bearing assembly that may encircle the shaft 72 and that may include a plurality of rolling elements 90 that may be disposed between an inner race 92 and an outer race 94. The inner race 92 may extend around and may be disposed on the first outer surface 80. The outer race 94 may extend around the rolling elements 90 and may be disposed on or contact a supporting component, such as the differential carrier 42.

In the configuration shown, two bearing assemblies are provided and may be referred to as a first bearing assembly 28 and a second bearing assembly 28' for clarity. The second bearing assembly 28' and its components are designated with the same reference numbers as the first bearing assembly 28 but include a prime symbol after the number. Thus, the second bearing assembly 28' includes rolling elements 90', an inner race 92', and an outer race 94' that are analogous to the corresponding components of the first bearing assembly 28.

The second outer surface 82, if provided, may be axially positioned or positioned along the axis 60 between the first outer surface 80 and the threaded portion 84. The second outer surface 82 may be an outside circumference of a portion of the shaft 72. As such, the second outer surface 82 may face away from the axis 60. The second outer surface 82 may have a smaller diameter than the first outer surface 80. One or more spacers 100 may be disposed on the second outer surface 82. The spacers 100 may be configured as rings that may encircle the shaft 72 and may be axially positioned between the inner races 92, 92' of the bearing assemblies 28, 28' to inhibit axial movement of the inner races 92, 92' toward each other. The spacers 100 may also transmit preload force between the bearing assemblies 28, 28'. The second bearing assembly 28' may also be disposed on the second outer surface 82.

It is contemplated that the second outer surface 82 may be omitted. For instance, the axial length of the first outer surface 80 may be increased and the second bearing assembly 28', the spacers 100, or both may be disposed on the first outer surface 80. It is also contemplated that additional outer surfaces may be provided. For instance, the second bearing assembly 28' may be disposed on a third outer surface that may extend between the second outer surface 82 and the threaded portion 84.

The threaded portion 84 facilitates installation of the preload nut 30. The threaded portion 84 may be axially positioned or positioned along the axis 60 between an outer surface and the spline 86. For instance, the threaded portion 84 may be axially positioned between the second outer surface 82 and the spline 86. The threaded portion 84 may include a thread that may spiral around the axis 60 and mate or mesh with a corresponding thread on the preload nut 30. In at least one configuration, the threaded portion 84 may have an outside diameter that may be smaller than the diameter of the first outer surface 80, the second outer surface 82, or combinations thereof.

The spline 86, if provided, may be disposed between the threaded portion 84 and a distal end of the shaft 72. The spline 86 may include a plurality of teeth. In at least one configuration, the teeth of the spline 86 may be disposed substantially parallel to the axis 60 and may mate with a corresponding spline of another component, such as the yoke 34, that may operatively connect the drive pinion 26 to the power source. The spline 86 may have an outside diameter that may be less than the diameter of the outside diameter of the threaded portion 84. It is also contemplated that the spline 86 may be omitted.

The fastener hole 88 may extend from a distal end of the shaft 72 toward the gear 70. The fastener hole 88 may be disposed along the axis 60. The fastener hole 88 may be a threaded hole and may be configured to receive a fastener 170, such as a bolt.

The preload nut 30 is mountable to the drive pinion 26 and engageable with a bearing assembly. In addition, the preload nut 30 is configured to exert a preload force on the one or more bearing assemblies 28, 28' that rotatably support the drive pinion 26 on the differential carrier 42. The preload nut 30 may include a first end 110, a second end 112, a hole 114, and a thread 116. In the configuration shown in FIGS. 2-4, the preload nut 30 includes an external circumferential surface 118 and one or more apertures 120.

The first end 110, which may also be referred to as a first end surface, may face away from the gear 70 and away from the first and second bearing assemblies 28, 28' when the preload nut 30 is installed on the drive pinion 26. For instance, the first end 110 may face toward and may engage or contact the yoke 34.

The second end 112, which may also be referred to as a second end surface, may be disposed opposite the first end 110. The second end 112 may face toward the gear 70 and the first and second bearing assemblies 28, 28' when the preload nut 30 is installed on the drive pinion 26. For instance, the second end 112 may face toward and may engage or contact the inner race 92' of the second bearing assembly 28'.

The hole 114 may be a through hole that may extend from the first end 110 to the second end 112. The shaft 72 of the drive pinion 26 may be received in and may extend through the hole 114.

The thread 116 is disposed in the hole 114. The thread 116 may mate with the threaded portion 84 of the drive pinion 26 to help secure the preload nut 30 to the drive pinion 26. In at least one configuration, the thread 116 may generally extend from the first end 110 toward or to the second end 112.

The external circumferential surface 118 encircles and faces away from the axis 60. The external circumferential surface 118 may extend between the first end 110 and the second end 112. In the configuration shown, the external circumferential surface 118 extends from the first end 110 to the second end 112. The external circumferential surface may be a smooth surface that may be radially disposed with respect to the axis 60.

One or more apertures 120 may be provided in the preload nut 30. The apertures 120 may receive a tool that may rotate the preload nut 30 to tighten or loosen the preload nut 30 to provide a desired bearing preload force. The apertures 120 may be blind holes or through holes. In the configuration shown, the apertures 120 are configured as blind holes and extend from the first end 110 toward the second end 112.

The seal assembly 32 is configured to seal an opening of the differential carrier 42 and provide a seal between the differential carrier 42 and the drive pinion 26 or between the differential carrier 42 and one or more components that are disposed on the drive pinion 26.

In the configuration shown in FIGS. 2-4, the seal assembly 32 encircles the preload nut 30 and extends from differential carrier 42 to the preload nut 30. For instance, the seal assembly 32 may engage or contact the external circumferential surface 118 of the preload nut 30. The seal assembly 32 may also encircle and extend to the yoke 34. In at least one configuration and as is best shown in FIG. 3, the seal assembly 32 may include an inner member 140 and an outer member 142. A deflector 144 may also be provided.

The inner member 140 may extend from the differential carrier 42 to the preload nut 30. For instance, the inner member 140 may extend from an internal surface of the differential carrier 42 that faces toward the axis 60 and/or from an end surface of the differential carrier 42 that defines or encircles an opening of the cavity 44 to the external circumferential surface 118 of the preload nut 30. The inner member 140 may be fixedly disposed on the differential carrier 42. The drive pinion 26, preload nut 30, and yoke 34 may be rotatable together about the axis 60 with respect to the inner member 140.

The outer member 142 may extend from the yoke 34 toward the differential carrier 42. For instance, the outer member 142 may extend from a first yoke outer surface 158 of the yoke 34 toward the differential carrier 42 such that at least a portion of the outer member 142 is encircled by the differential carrier 42 and the inner member 140. The outer member 142 may be rotatable about the axis 60 with the yoke 34 and may be rotatable about the axis 60 with respect to the inner member 140. The outer member 142 may be axially positioned farther outboard or farther away from the preload nut 30 than the inner member 140.

The deflector 144, if provided, helps cover or conceal the seal assembly 32 and the opening of the differential carrier 42 in which the seal assembly 32 is received. As such, the deflector 144 may help block or prevent some contaminants from reaching the seal assembly 32. The deflector 144 may be fixedly disposed on the yoke 34 and may extend away from the axis 60 and around the end surface of the differential carrier 42. The deflector 144 may be spaced apart from the differential carrier 42 so that the deflector 144 may rotate about the axis 60 with the drive pinion 26 and the yoke 34 and with respect to the differential carrier 42. The deflector 144 may encircle a portion of the differential carrier 42, the inner member 140, the outer member 142, or combinations thereof.

Referring to FIGS. 3 and 4, the yoke 34 is configured to facilitate coupling of the drive pinion 26 to the power source or to another axle assembly. For instance, the yoke 34 may be coupled to another component, such as a universal joint, which in turn may be coupled to a torque transmitting component like a drive shaft or a prop shaft. The yoke 34 may be stationarily mounted to the drive pinion 26. In at least one configuration, the yoke 34 includes a first yoke end surface 150, a second yoke end surface 152, a yoke hole 154, a yoke spline 156, a first yoke outer surface 158, a second yoke outer surface 160, or combinations thereof.

Referring primarily to FIG. 3, the first yoke end surface 150 may face away from the gear 70 and the preload nut 30 when the yoke 34 is installed on the drive pinion 26. A fastener 170, such as a bolt or bolt and washer, may be provided to inhibit axial movement of the yoke 34 or movement along the axis 60 with respect to the shaft 72 of the drive pinion 26. For instance, the fastener 170 may be threaded into the fastener hole 88 in the shaft 72 may engage the first yoke end surface 150.

The second yoke end surface 152 may be disposed opposite the first yoke end surface 150. The second yoke end surface 152 may face toward the gear 70. The second yoke end surface 152 may engage or contact the first end 110 of the preload nut 30 when the yoke 34 is installed on the drive pinion 26.

Referring to FIG. 4, the yoke hole 154 may be a through hole that may extend from the first yoke end surface 150 to the second yoke end surface 152. The shaft 72 of the drive pinion 26 may be received in the yoke hole 154. For instance, the spline 86 of the shaft 72 may be received in the yoke hole 154. As such, the yoke 34 may encircle the shaft 72.

Referring primarily to FIG. 3, the yoke spline 156 may be disposed in the yoke hole 154. The yoke spline 156 may include a plurality of teeth that extend toward the axis 60. The yoke spline 156 may mate or mesh with the spline 86 of the drive pinion 26 to inhibit rotation of the yoke 34 about the axis 60 with respect to the drive pinion 26.

The first yoke outer surface 158 faces away from the axis 60. The first yoke outer surface 158 may extend from the second yoke end surface 152. The first yoke outer surface 158 may be disposed closer to the axis 60 than the external circumferential surface 118 of the preload nut 30 is disposed to the axis 60. The seal assembly 32 may engage the first yoke outer surface 158.

The second yoke outer surface 160 also faces away from the axis 60. The second yoke outer surface 160 may be disposed farther from the axis 60 than the first yoke outer surface 158 is disposed from the axis 60. The deflector 144 may engage the second yoke outer surface 160.

In the configuration shown in FIGS. 2-4, the yoke 34 may inhibit rotation of the preload nut 30. For instance, the preload nut 30 may extend axially from the inner race 92 of the bearing assembly 28' to the yoke 34. The yoke 34 may abut the preload nut 30 and thereby prevent rotation of the preload nut 30 about the axis 60 when the yoke 34 is secured to the shaft 72.

Figure 5:
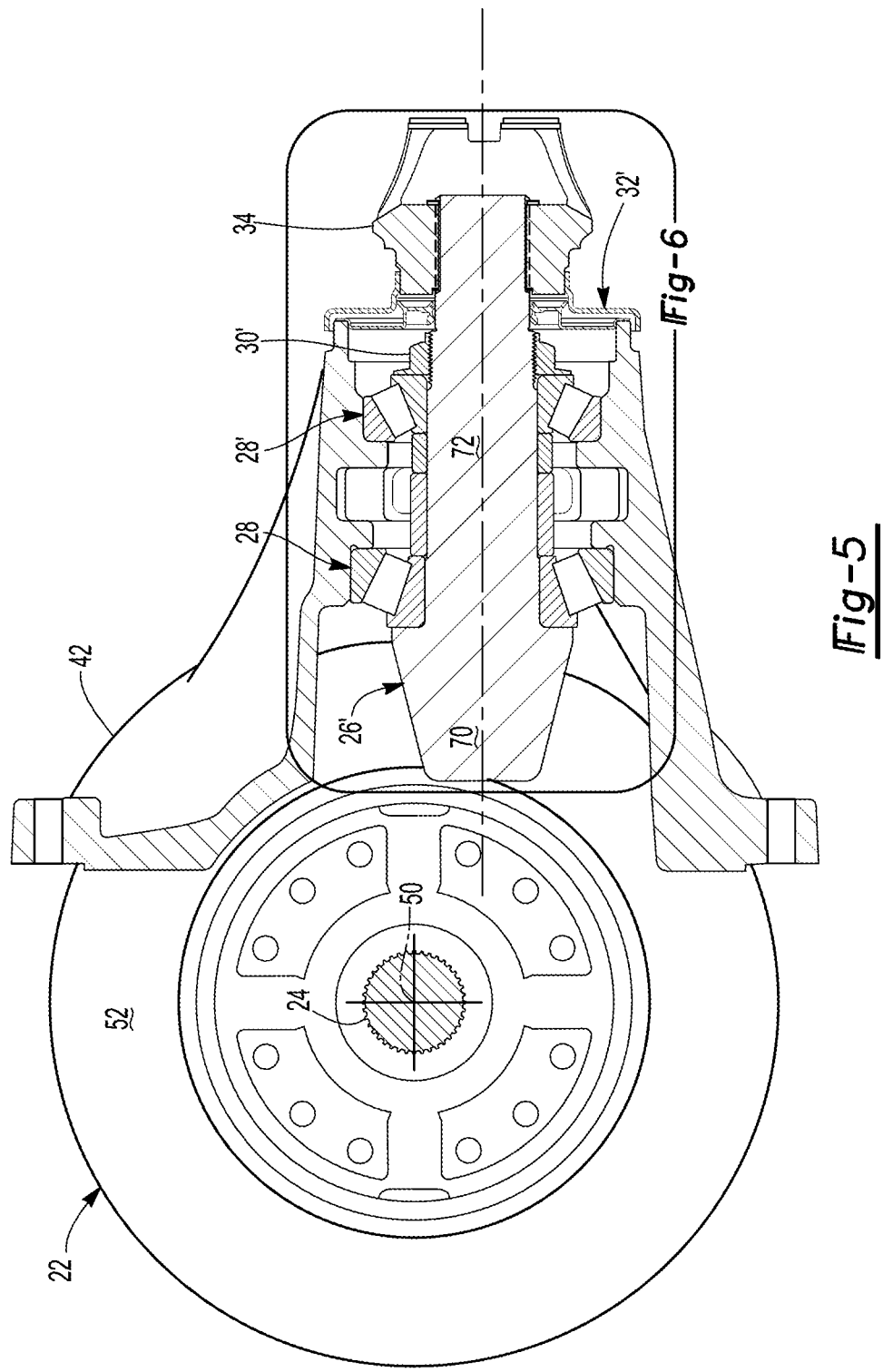
FIG. 5 is a section view of a second embodiment of the axle assembly of FIG. 1 along section line 2-2 with the axle housing omitted for clarity.
Figure 6:
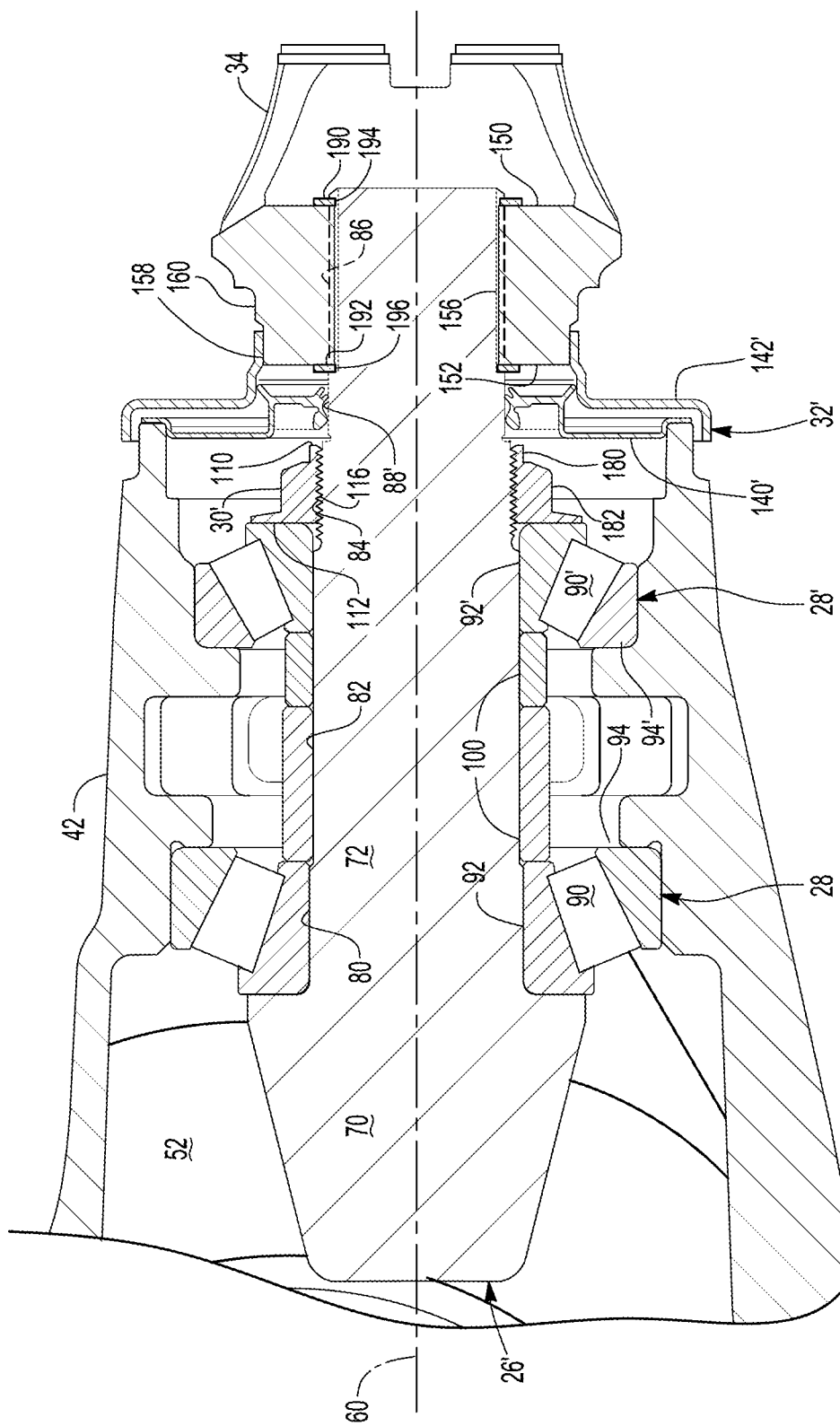
FIG. 6 is a magnified view of a portion of FIG. 5.
Figure 7:
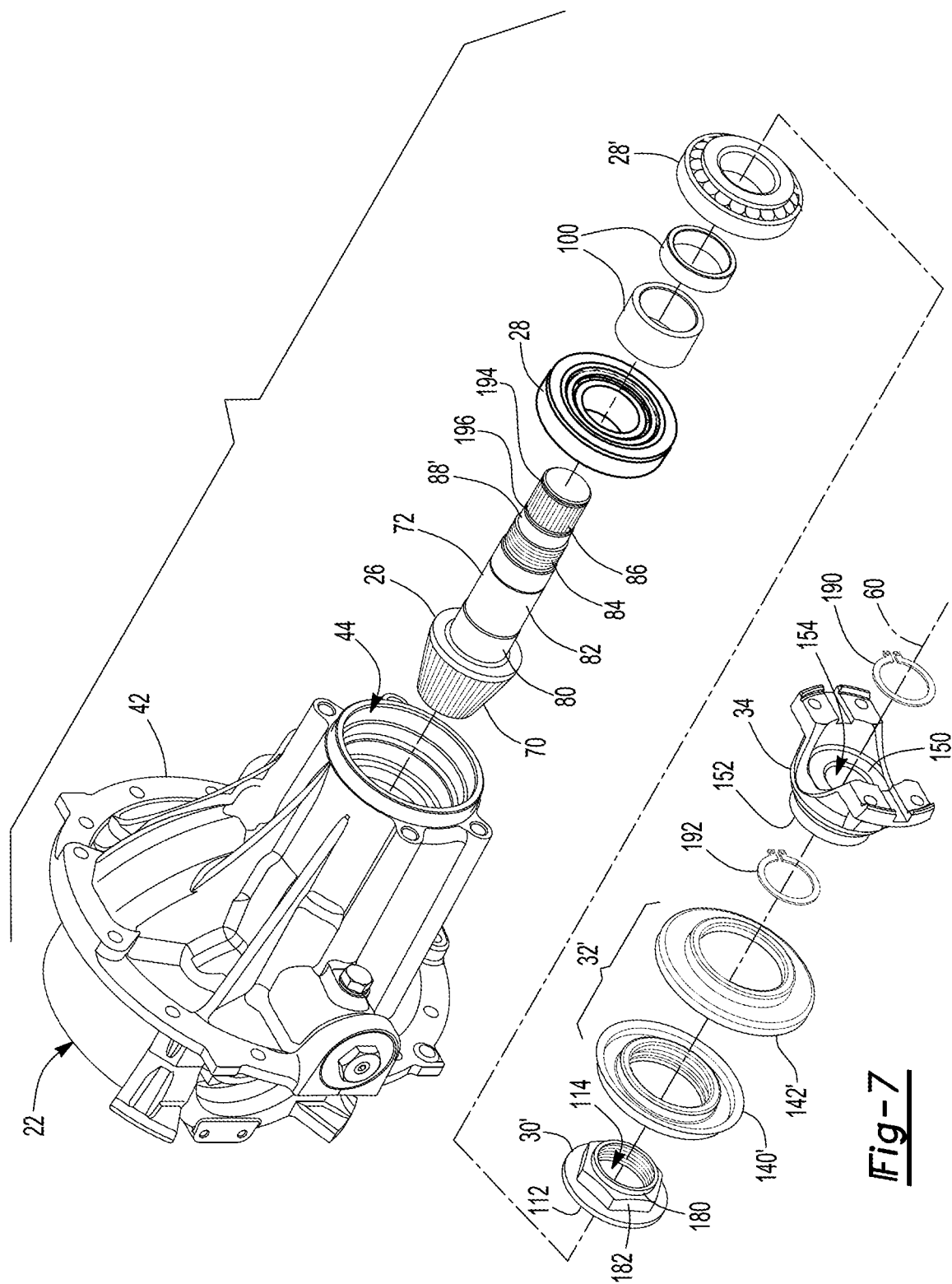
FIG. 7 is an exploded view of the portion of the axle assembly shown in FIG. 6.

Referring to FIGS. 5-7, another configuration is shown. This configuration is similar to that shown in FIGS. 2-4 but includes modifications to the drive pinion, preload nut, and seal assembly. In this configuration, the seal assembly 32' encircles the shaft 72 of the drive pinion 26', extends from the shaft 72 to the differential carrier 42, and is spaced apart from the preload nut 30'.

Referring primarily to FIG. 6, the drive pinion 26' extends along or around the axis 60 and includes a gear 70 as previously described and a shaft 72. The shaft 72 includes at least one outer surface, such as a first outer surface 80 and/or a second outer surface 82, a threaded portion 84, and a spline 86 like that previously described. The shaft 72 may omit the fastener hole 88 and include a journal surface 88'.

The journal surface 88' faces away from the axis 60 and may be an outside circumferential surface of the shaft 72. The journal surface 88' may be axially positioned or positioned along the axis 60 or axially positioned between the threaded portion 84 and the spline 86. The journal surface 88' may be an outside circumference of a portion of the shaft 72. As such, the journal surface 88' may face away from the axis 60. The journal surface 88' may be positioned closer to the axis 60 than the threaded portion 84 is positioned to the axis 60. The journal surface 88' may be positioned farther from the axis 60 than the spline 86 is positioned from the axis 60. For instance, the journal surface 88' may have a smaller diameter than the threaded portion 84 and a larger diameter than the spline 86. The seal assembly 32' may be disposed on and may engage or contact the journal surface 88'.

The preload nut 30' is configured to thread onto the threaded portion 84 of the shaft 72 and exert a preload force on one or more bearing assemblies as previously discussed. The preload nut 30' includes a first end 110, a second end 112, a hole 114, and a thread 116 but omits the external circumferential surface and apertures associated with the configuration in FIGS. 2-4. In this configuration, the preload nut 30' may include a deformable ring 180 and a tool engagement portion 182.

Referring to FIGS. 6 and 7, the deformable ring 180 may extend from the first end 110 toward the second end 112. For instance, the deformable ring 180 may extend from the first end 110 to the thread 116. The deformable ring 180 may extend continuously around the axis 60; however, it is contemplated that the deformable ring 180 may be discontinuous. The deformable ring 180 may be deformable to engage the shaft 72 to inhibit rotation of the preload nut 30' about the axis 60 with respect to the drive pinion 26'. For instance, the deformable ring 180 may be deformed or staked against the drive pinion 26', such as into a recess or indentation in the shaft 72 of the drive pinion 26' to inhibit rotation of the preload nut 30'. The deformable ring 180 may unthreaded.

The tool engagement portion 182 may be axially positioned between the deformable ring 180 and the second end 112. In at least one configuration, the tool engagement portion 182 may include a plurality of intersecting flat surfaces that may be grasped by a tool, such as a wrench or socket, to facilitate tightening and loosening of the preload nut 30'.

The seal assembly 32' is axially positioned or positioned along the axis 60 between the preload nut 30' and the yoke 34. The seal assembly 32' is configured to engage the journal surface 88' of the shaft 72. The seal assembly 32' may include an inner member 140' and an outer member 142'.

The inner member 140' may extend from the differential carrier 42 to the drive pinion 26'. For instance, the inner member 140' may extend from an internal surface and/or an end surface of the differential carrier 42 that defines the opening of the differential carrier 42 to the journal surface 88' of the drive pinion 26'. The inner member 140' may be spaced apart from the preload nut 30' and the yoke 34. The inner member 140' may be fixedly disposed on the differential carrier 42. The drive pinion 26' and yoke 34 may be rotatable together about the axis 60 with respect to the inner member 140'.

The outer member 142' may extend from the yoke 34 toward the differential carrier 42. For instance, the outer member 142' may extend from a first yoke outer surface 158 of the yoke 34 toward the differential carrier 42 such that the outer member 142' encircles the differential carrier 42 and the inner member 140'. As such, the outer member 142' may be rotatable about the axis 60 with the yoke 34 and may be rotatable about the axis 60 with respect to the inner member 140'. A portion of the inner member 140' may engage or extend to the outer member 142' to facilitate sealing between the inner member 140' in the outer member 142'.

The configuration shown in FIGS. 5-7 may include one or more retaining features, such as a first retaining feature 190 and a second retaining feature 192.

Referring to FIG. 6, the first retaining feature 190 may be a separate component from the shaft 72. The first retaining feature 190 may be installable onto the shaft 72 and removable from the shaft 72. The first retaining feature 190 may engage the yoke 34 to inhibit movement of the yoke 34 away from the preload nut 30', or to the right from the perspective shown in FIG. 6. For instance, the first retaining feature 190 may engage or contact the first yoke end surface 150. The first retaining feature 190 may be received in a first groove 194 of the shaft 72. The first retaining feature 190 may have any suitable configuration. For instance, the first retaining feature 190 may be configured as a clip, snap ring, or the like.

The second retaining feature 192 may be a separate component from the shaft 72. The second retaining feature 192 may be installable onto the shaft 72 and removable from the shaft 72. The second retaining feature 192 may engage the yoke 34 to inhibit movement of the yoke 34 toward from the preload nut 30', or to the left from the perspective shown in FIG. 6. For instance, the second retaining feature 192 may engage or contact the first yoke end surface 150, an at end of the yoke spline 156, or combinations thereof. The second retaining feature 192 may be received in a second groove 196 of the shaft 72. In at least one configuration, the second retaining feature 192 may be received in the yoke hole 154 and the yoke 34 may encircle the second retaining feature 192. The second retaining feature 192 may have any suitable configuration. For instance, the second retaining feature 192 may be configured as a clip, snap ring, or the like.

In the configurations shown in FIGS. 2-4 and 5-7, the preload nut 30, 30' may be tightened to exert a desired axial preload force against one or more bearing assemblies 28, 28', which may inhibit or prevent spinning of the inner race 92, 92' with respect to the drive pinion 26, 26' and/or spinning of the outer race 94, 94' with respect to the differential carrier 42 and remove excess play, which may result in reduced bearing life. The seal assembly 32, 32' and yoke 34 may be installed after the preload force is set.

An axle assembly as described above may allow a bearing preload to be set independently from the yoke. More specifically, the bearing preload may be set using a preload nut that may be tightened to exert a desired axial preload force against one or more bearing assemblies prior to installation of the yoke. The yoke in turn may either not engage the preload nut or may engage the preload nut in a manner that prevents loosening of the preload nut. This may allow the preload force to be set independent of installation or removal of the yoke, independent of installing or tightening of a fastener that may secure the yoke to the drive pinion, and avoid contact between the yoke and a bearing assembly. As such, the bearing preload force may be set more accurately and installation and removal of the yoke may have no impact or a negligible impact on the established bearing preload force. The present invention may also allow a seal assembly to provide sealing between the differential carrier and a component other than the yoke, such as the preload nut or the shaft of the drive pinion, which may permit installation and removal of the yoke without affecting sealing integrity. The present invention may also allow the seal assembly to be installed after the bearing preload is set. As such, installation and removal of the seal assembly may have no impact or a negligible impact on an established bearing preload force.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a differential carrier;
a drive pinion that is rotatable about an axis, the drive pinion including:
a gear; and
a shaft that extends from the gear, the shaft having a threaded portion;
a bearing assembly that encircles the shaft and that rotatably supports the drive pinion on the differential carrier;
a preload nut that has a thread that mates with the threaded portion and that engages the bearing assembly and exerts a preload force on the bearing assembly;
a yoke that encircles and is mounted to the shaft, wherein the yoke inhibits rotation of the preload nut; and
a seal assembly that encircles the preload nut and extends from the preload nut to the differential carrier, wherein the seal assembly encircles and engages the preload nut and the yoke.

2. The axle assembly of claim 1 wherein the preload nut has an external circumferential surface that encircles and faces away from the axis and wherein the seal assembly engages the external circumferential surface.

3. The axle assembly of claim 1 wherein the shaft includes an outer surface and a spline and the threaded portion is axially positioned between the outer surface and the spline.

4. An axle assembly comprising:
a differential carrier;
a drive pinion that is rotatable about an axis, the drive pinion including:
a gear; and
a shaft that extends from the gear, the shaft having a threaded portion;
a bearing assembly that encircles the shaft and that rotatably supports the drive pinion on the differential carrier;
a preload nut that has a thread that mates with the threaded portion and that engages the bearing assembly and exerts a preload force on the bearing assembly;
a seal assembly that encircles the preload nut and extends from the preload nut to the differential carrier; and
a yoke that encircles and is mounted to the shaft, wherein the yoke inhibits rotation of the preload nut.

5. The axle assembly of claim 1 wherein the preload nut extends axially from an inner race of the bearing assembly to the yoke.

6. The axle assembly of claim 1 wherein the seal assembly comprises an inner member that extends from the differential carrier and the preload nut and an outer member that extends from the inner member and the yoke.

7. The axle assembly of claim 1 wherein the preload nut has an end surface that engages the yoke and a plurality of blind holes that extend from the end surface toward the bearing assembly.

8. The axle assembly of claim 1 further comprising a deflector that extends from the yoke and that encircles a portion of the differential carrier.

9. The axle assembly of claim 8 wherein the yoke has a yoke end surface that engages the preload nut, a first outer yoke surface that faces away from the axis and extends from the yoke end surface, and a second yoke outer surface that faces away from the axis and is disposed farther from the axis than the first outer yoke surface is disposed from the axis, wherein the seal assembly engages the first outer yoke surface and the deflector engages the second yoke outer surface.

10. The axle assembly of claim 9 wherein the preload nut has an external circumferential surface that encircles and faces away from the axis, and wherein the first outer yoke surface is disposed closer to the axis than the external circumferential surface is disposed to the axis.

11. The axle assembly of claim 9 wherein the preload nut has an external circumferential surface that encircles and faces away from the axis, and wherein the first outer yoke surface is disposed closer to the axis than the external circumferential surface and the second yoke outer surface are disposed to the axis.

12. The axle assembly of claim 11 wherein the seal assembly has an inner member that extends from the differential carrier to the external circumferential surface and an outer member that extends from the first outer yoke surface toward the differential carrier and that is encircled by the differential carrier and the inner member.

13. An axle assembly comprising:
a differential carrier;
a drive pinion that is rotatable about an axis, the drive pinion including:
a gear; and
a shaft that extends from the gear, the shaft having a threaded portion; and
a bearing assembly that encircles the shaft and that rotatably supports the drive pinion on the differential carrier;
a preload nut that has a thread that mates with the threaded portion and that engages the bearing assembly and exerts a preload force on the bearing assembly;
a seal assembly that encircles the shaft and extends from the shaft to the differential carrier; and
a yoke that encircles and is mounted to the shaft, wherein the seal assembly is axially positioned between the preload nut and the yoke.

14. The axle assembly of claim 13 wherein the seal assembly is spaced apart from the preload nut.

15. The axle assembly of claim 13 wherein the seal assembly has an inner member that extends from the differential carrier to the shaft and is spaced apart from the preload nut and the yoke, and an outer member that extends from the yoke and the inner member, and that encircles the differential carrier and the inner member.

16. The axle assembly of claim 13 wherein the shaft has a spline that engages the yoke and a journal surface that faces away from the axis and is axially positioned between the threaded portion and the spline, wherein the seal assembly engages the journal surface.

17. The axle assembly of claim 16 wherein the journal surface is positioned closer to the axis than the threaded portion is positioned to the axis and is positioned farther from the axis than the spline is positioned from the axis.

18. The axle assembly of claim 16 wherein the seal assembly has an inner member that extends from the differential carrier to the journal surface and is spaced apart from the preload nut and the yoke, and an outer member that extends from the yoke, engages the inner member, and encircles the differential carrier and the inner member.

19. The axle assembly of claim 13 further comprising first and second retaining features that are separate from the shaft and are mounted to the shaft, wherein the first retaining feature engages the yoke to inhibit movement of yoke away from the preload nut and the second retaining feature engages the yoke to inhibit movement of the yoke toward the preload nut.

20. The axle assembly of claim 19 wherein the first and second retaining features are received in first and second grooves in the shaft, respectively.

\* \* \* \* \*